United States Patent [19]
Mennemeier et al.

[11] Patent Number: 5,907,842
[45] Date of Patent: *May 25, 1999

[54] METHOD OF SORTING NUMBERS TO OBTAIN MAXIMA/MINIMA VALUES WITH ORDERING

[75] Inventors: Larry Mennemeier, Bolder Creek, Calif.; Alexander Peleg, Haifa, Israel; Carole Dulong, Saratoga; Millind Mittal, South San Francisco, both of Calif.; Benny Eitan, Haifa, Israel; Eiichi Kowashi, Ryugasaki, Japan

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/575,606

[22] Filed: Dec. 20, 1995

[51] Int. Cl.$^6$ .................................................... G06F 17/30
[52] U.S. Cl. .......................... 707/7; 707/6; 395/800.16; 395/386; 395/562; 364/736.5
[58] Field of Search ...................... 395/375, 769, 395/800, 562, 800.16, 386; 364/736.5; 345/515; 472/88

[56] References Cited

U.S. PATENT DOCUMENTS

| | | | |
|---|---|---|---|
| 3,711,692 | 1/1973 | Batcher | 235/175 |
| 3,723,715 | 3/1973 | Chen et al. | 235/175 |
| 4,068,299 | 1/1978 | Bachman | 364/200 |
| 4,139,899 | 2/1979 | Tulpule et al. | 364/900 |
| 4,161,784 | 7/1979 | Cushing et al. | 364/748 |
| 4,393,468 | 7/1983 | New | 364/736 |
| 4,418,383 | 11/1983 | Doyle et al. | 364/200 |
| 4,467,444 | 8/1984 | Harmon et al. | 364/900 |
| 4,498,177 | 2/1985 | Larson | 371/52 |
| 4,656,581 | 4/1987 | Ohwada | 364/200 |
| 4,707,800 | 11/1987 | Montrone et al. | 364/788 |
| 4,760,545 | 7/1988 | Ingami et al. | 364/200 |
| 4,771,379 | 9/1988 | Ando et al. | 364/200 |
| 4,811,269 | 3/1989 | Hirose et al. | 364/754 |
| 4,825,355 | 4/1989 | Kurakazu et al. | 364/200 |
| 4,857,882 | 8/1989 | Wagner et al. | 340/146.2 |
| 4,881,168 | 11/1989 | Inagami et al. | 364/200 |

(List continued on next page.)

OTHER PUBLICATIONS

International Search Report PCT/US95/15719, Mar. 20, 1996.
International Publication No.: WO 96/17292 dated Jun. 6, 1996, of International Application No.: PCT/US95/1519.
Intel i750, i860 TM, i960 Processors and Related Products pp. 1–3 (1993).
PCT International Search Report, Mailed Sep. 27, 1996 for International application No. PCT/US96/11893, 2 Pages total.
B. Case, *Philips Hopes to Displace DSPs with VLIW*, Microprocessor Report (Dec. 94), pp. 12–18.

(List continued on next page.)

*Primary Examiner*—Thomas G. Black
*Assistant Examiner*—Jean M. Corrielus
*Attorney, Agent, or Firm*—Blakely, Sokoloff, Taylor & Zafman LLP

[57] ABSTRACT

A technique for sorting packed numbers of two operands into minima or maxima operand with their indices to identify the origin of those selected values. After packing two source operands with a plurality of data elements containing numerical values, greater-than comparison operation is performed on the two operands to generate a mask. The mask is used to identify those corresponding pair of data elements of the first and second operands which need to be passed through the subsequent stages in order to generate a sorted minima or maxima. The operands are AND'ed with the mask or the complement of the mask to generate the required minima/maxima result. The same AND'ing technique is used with two other operands containing indices of the values in the first two operands. The indices identify the originating location of the sorted maxima/minima.

11 Claims, 7 Drawing Sheets

U.S. PATENT DOCUMENTS

| | | | |
|---|---|---|---|
| 4,949,250 | 8/1990 | Bhandarkar et al. | 364/200 |
| 4,984,183 | 1/1991 | Ohuchi | 364/521 |
| 4,985,848 | 1/1991 | Pfeiffer et al. | 364/518 |
| 4,989,168 | 1/1991 | Kuroda et al. | 364/715.09 |
| 5,001,662 | 3/1991 | Baum | 364/757 |
| 5,095,457 | 3/1992 | Jeong | 364/758 |
| 5,126,964 | 6/1992 | Zurawski et al. | 364/757 |
| 5,130,692 | 7/1992 | Ando et al. | 340/146.2 |
| 5,148,386 | 9/1992 | Hori | 364/715.01 |
| 5,168,517 | 12/1992 | Hoover et al. | 395/800 |
| 5,168,571 | 12/1992 | Hoover et al. | 395/800 |
| 5,187,679 | 2/1993 | Vassiliadis | 364/786 |
| 5,193,167 | 3/1993 | Sites et al. | 395/425 |
| 5,241,574 | 8/1993 | Hayashi | 377/39 |
| 5,265,204 | 11/1993 | Kimura et al. | 395/166 |
| 5,276,891 | 1/1994 | Patel | 395/775 |
| 5,294,911 | 3/1994 | Uchida et al. | 340/146.2 |
| 5,297,161 | 3/1994 | Ling | 375/145.5 |
| 5,327,543 | 7/1994 | Miura et al. | 395/375 |
| 5,375,080 | 12/1994 | Davies | 364/736.5 |
| 5,375,235 | 12/1994 | Berry et al. | 395/600 |
| 5,390,135 | 2/1995 | Lee et al. | 364/749 |
| 5,408,670 | 4/1995 | Davies | 395/800 |
| 5,423,010 | 6/1995 | Mizukami | 395/375 |
| 5,465,374 | 11/1995 | Dinkjian et al. | 395/800 |
| 5,487,159 | 1/1996 | Byers et al. | 395/375 |
| 5,497,468 | 3/1996 | Tani et al. | 395/375 |
| 5,541,865 | 7/1996 | Ashkenazi | 364/715.09 |
| 5,555,428 | 9/1996 | Radigan et al. | 395/800 |
| 5,560,007 | 9/1996 | Thai | 395/600 |
| 5,564,057 | 10/1996 | Hardewig et al. | 395/800 |
| 5,568,624 | 10/1996 | Sites et al. | 395/375 |
| 5,651,121 | 7/1997 | Davies | 395/376 |

OTHER PUBLICATIONS

N. Margulis, *i860 Microprocessor Architecture*, McGraw Hill, Inc. (1990) Ch. 6, 7, 8, 10, 11.

*Pentium Processor User's Manual, vol. 3: Architecture and Programming Manual,* Intel Corporation (1993), Ch. 1,3,4, 6,8, and 18.

*TMS320C2x User's Guide,* Texas Instruments (1993) pp. 3–2 through 3–11; 3–28 through 3–34; 4–1 through 4–22; 4–41; 4–103; 4–119 through 4–120; 4–122; 4–150 through 4–151.

L. Gwennap, *New PA–RISC Processor Decodes MPEG Video,* Microprocessor Report (Jan. 1994), pp. 16, 17.

SPARC Technology Business, *UltraSPARC Multimedia Capabilities On–Chip Support for Real–Time Video and Advanced Graphics,* Sun Microsystems (Sep. 1994).

Y. Kawakami et al., *LSI Applications: A Single–Chip Digital Signal Processor for Voiceband Applications,* Solid State Circuits Conference, Digest of Technical Papers; IEEE International (1980).

J. Shipnes, *Graphics Processing with the 88110 RISC Microprocessor,* IEEE (1992), pp. 169–174.

*MC88110 Second Generation RISC Microprocessor User's Manual,* Motorola Inc. (1991).

*Errata to MC88110 Second Generation RISC Microprocessor User's Manual,* Motorola Inc. (1992), pp. 1–11.

*MC88110 Programmer's Reference Guide,* Motorola Inc. (1992), pp. 1–4.

*i860™ Microprocesor Family Programmer's Refernce Manual,* Intel Corporation (1992), Ch. 1, 3, 8, 12.

R. B. Lee, *Accelerating Multimedia With Enhanced Microprocessors*, IEEE Micro (Apr. 1995), pp. 22–32.

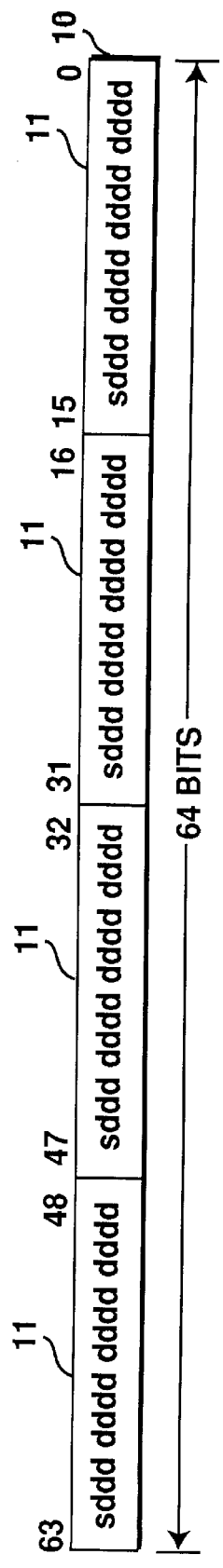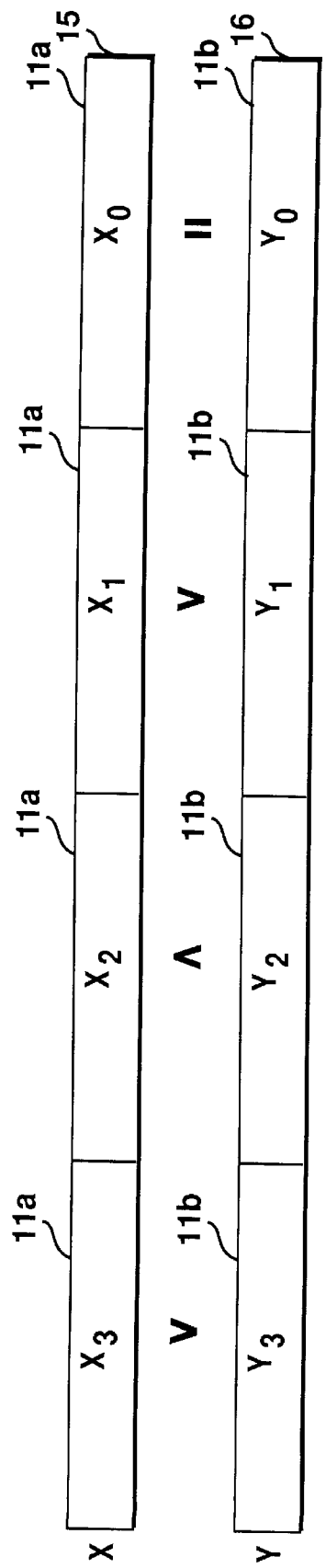
FIG. 1
FIG. 2

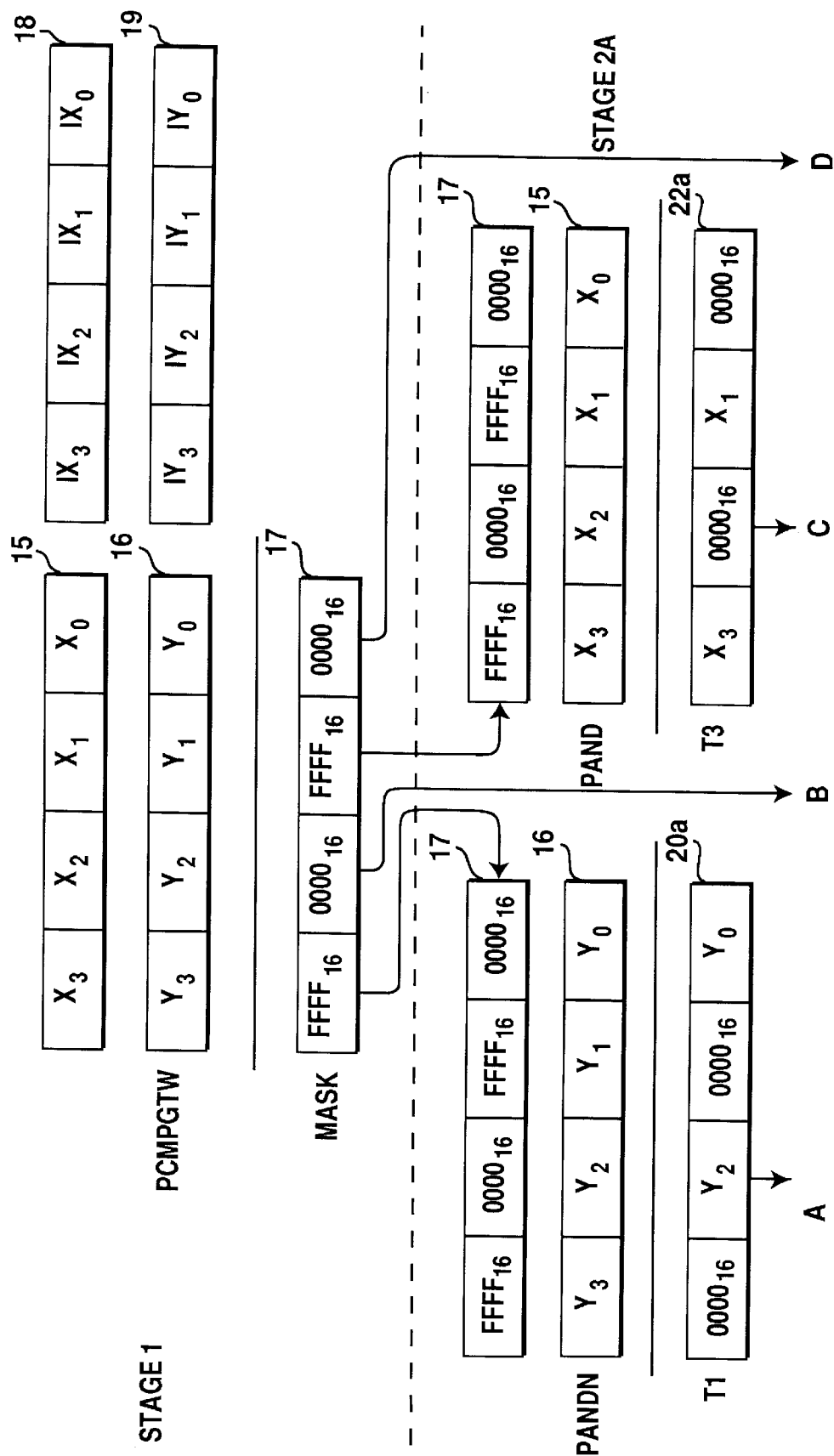

METHOD OF SORTING NUMBERS TO OBTAIN MAXIMA/MINIMA VALUES WITH ORDERING

BACKGROUND OF THE INVENTION

1. Field of the Invention

The present invention relates to the field of microprocessors and, more particularly, to a technique of sorting numbers to find values of maxima or minima with ordering.

2. Prior Art

In the utilization of processors, microprocessors and computer systems, it is the practice to manipulate large amounts of data represented in various forms. For most operations, the data is generally in a scalar format where operations are performed on such scalar values. For example, an adding of two numerical values entails the loading of the two values in two registers and numerically (either in integer form or floating point form) adding the two numbers. In order to speed the execution of current and subsequent instructions, many processors now employ the use of pipe-lining stages to enhance processing speed of the processor. The use of various instructions which operate on two data elements are well-known in the art.

A different type of data representation is a format referred to as "Packed Data" format. In the packed data format, a number of data elements are now grouped together into a common bit string having a specified width. For example, a packed data string may have four individual data elements, each having a specified width. Furthermore, as an example, a packed data format having 64 bits may be comprised of four 16-bit data elements. A significant advantage of having such a packed data format resides in the multiple operations which can be performed on the data string. Accordingly, with the noted example above, a packed add instruction can be invoked to add two packed data words (wherein each packed word is comprised of four data elements). In this packed addition, corresponding pairs of data elements of the two words are added. Unlike the scalar add operation, the packed add instruction in this instance would perform four different add operations (one for each pair of corresponding data elements) in parallel in response to a single instruction.

As can be appreciated, a separate set of packed instruction set would be required in order to operate on the packed data format, as well as providing the necessary operations for packing and unpacking data. Generally, the specialized instruction set can be designed into a general purpose processor at low cost, because most of the circuitry dedicated to scalar operations can be reused. However, such a processor would have significant processing advantages when packed data operations can be used instead of singular data operations.

One area where packed data operations are susceptible for improving performance is in the manipulation of multimedia data. That is, video, graphic and sound data can be manipulated in packed format using packed instructions. A variety of functions can be solved or data rearranged based on the use of the packed instruction set. One such manipulation is the sorting of numbers to determine which number from a pair of numbers is greater (or lesser) in value. A patent application titled "Method Of Sorting Signed Numbers And Solving Absolute Differences Using Packed Instructions" (application Ser. No. 08/575,605, filed Dec. 20, 1995, abandoned) describes the sorting of packed data elements from two source operands into maxima and minima operands.

This described technique compares the corresponding packed data elements from each of the operands and identifies which of the pair is greater in value. The greater values are then sorted into the maxima operand and the lesser-or-equal values are sorted into the minima operand. Although this technique sorts values correctly, there is no way of identifying from which source operand a particular value originated. That is, without some form of a tag or index associated with the selected value, only the value of the selected data is known.

Examples of using such minima and/or maxima values are well known in the area of recognition. Speech, handwriting and some image recognition functions require a comparison of patterns in which data input is compared to a value for recognition matching. In instances where a desired outcome is the selection of either the minima or the maxima, but not both, it is usually desirable to determine from which operand a particular lesser or greater value originated. In order to do this, a tag or an index will need to be associated with each data value to identify its originating location. Thus, not only is the sorting of the data required, but ordering of the selected (chosen) data must also be determined. One such example of a use of minima/maxima sorting with ordering is the use of a Viterbi algorithm (which is used in modem operations and in recognition applications) for applications which operate differently on data depending on their values with respect to a given threshold. So for example, if the data are below the threshold, one set of operations would be performed, and if the data are above the threshold, a different set of operations would be performed. Thus, the sorting operation would compare the data input to reference values to determine which is greater (or lesser) for these recognition functions.

Accordingly, the present invention describes a scheme in which a plurality of data elements are operated on in parallel to sort the maxima (or minima) from each pair of numbers into an output operand and also to identify the source location for those elements chosen.

SUMMARY OF THE INVENTION

The present invention describes a technique for sorting packed numbers along with indices of those numbers chosen in order to identify the origin of those selected values. After packing a first set of two source operands with a plurality of data elements containing numerical values, a comparison operation is performed on the two operands to generate a mask operand (mask). The mask is used to identify those corresponding pair of data elements of the first and second operands which meet the comparison requirement of being a larger (or lesser) value. Subsequently, data elements of the first operand are AND'ed with the complement of the generated mask. At the same time, data elements of the second operand are AND'ed with the mask. The two results are then OR'ed to generate a result containing all lesser or equal values (minima) or greater or equal values (maxima).

Once the mask is generated, an equivalent set of operations described above is performed with a second set of two source operands containing indices of the original values. The indices are used to identify the originating location of the data elements in the first and second operands. Data elements representing the indices for the values in the first operand are AND'ed with the complement of the earlier generated mask. At the same time, data elements representing the indices for the values in the second operand are AND'ed with the mask. The two results are then OR'ed to generate a result containing indices for all minima selected. Accordingly, minima are sorted into a single operand with a second operand containing the indices for those selected minima.

In order to find the maxima and their indices, the complement of the generated mask is AND'ed with the data elements of the second operand, as well as the operand containing their indices in a separate but equivalent operation. The first operand data elements are AND'ed with the mask, as well as the operand containing their indices in a separate but equivalent operation. Essentially the AND operation of the mask and its complement are reversed with the source operands for finding the maxima.

Economic Advantage

The implementation of a packed instruction set to operate on packed data permits parallel operations to be performed with one instruction. Specifically, a number of values are sorted, instead of just one at a time, to allow for the parallel operations with each instruction. Furthermore, where scalar techniques require branching instruction(s), no such branching is required with the present invention. Thus, the sequence of instructions of the present invention to manipulate data allows for the sorting of maxima or minima with ordering to be achieved in order to reduce computational time without the use of branching instructions. The simplicity and reduced use of instructions enhances processing speed and overall performance.

BRIEF DESCRIPTION OF THE DRAWINGS

FIG. 1 is a diagram illustrating a packing of four 16-bit signed data element values into a 64-bit packed word.

FIG. 2 is a diagram illustrating a numerical comparison relationship between each pair of corresponding data elements of two hypothetical packed operands X and Y.

FIGS. 4A and 4B show a sequence diagram illustrating operations performed on packed operands X and Y in order to sort data elements of X and Y into maxima values and also to provide indices for those elements chosen.

DETAILED DESCRIPTION OF THE PREFERRED EMBODIMENT

Figure 3A:
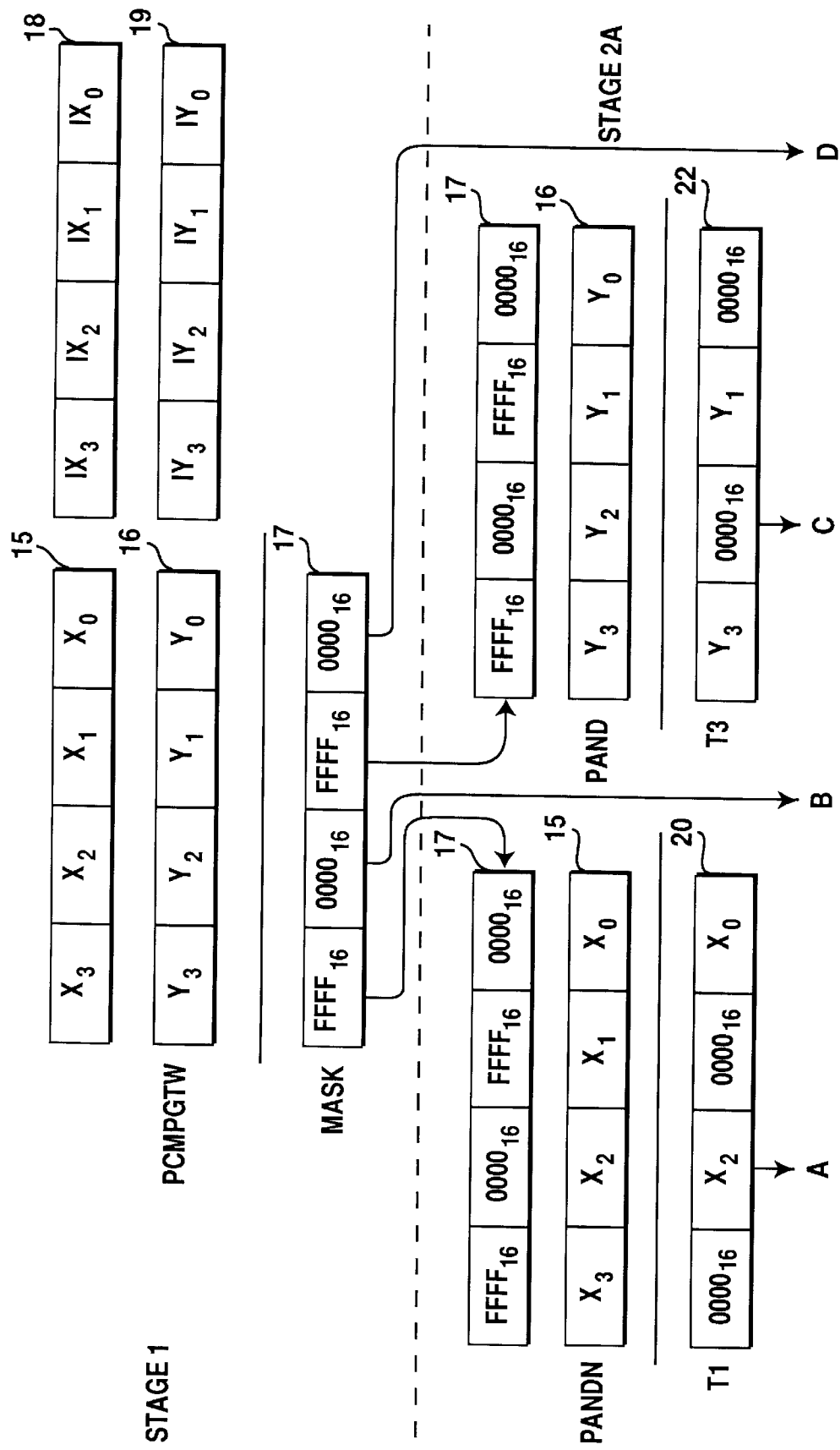
FIGS. 3A and 3B show a sequence diagram illustrating operations performed on packed operands X and Y in order to sort data elements of X and Y into minima and also to provide indices for those elements chosen.

A technique for sorting packed numbers to determine greater (or lesser) values with indices which identify the origin of those selected values is described. In the particular embodiment, the numbers are packed into a packed data format, wherein sorting entails the comparison of corresponding packed numbers from two different operands and sorting these numbers into a minima (or maxima) operand along with their indices, which identify the originating location for the values selected from the comparison operation. In the following description, numerous specific details are set forth, such as specific devices, program instructions, logical operations, bit length for data, etc., in order to provide a thorough understanding of the present invention. However, it will be obvious to one skilled in the art that the present invention may be practiced without these specific details. In other instances, well known techniques and structures have not been described in detail in order not to unnecessarily obscure the present invention.

It is to be noted that a preferred embodiment of the present invention is described in reference to a 64-bit packed data string (64-bit word), however, it is readily understood that other embodiments having more or less number of bits can be implemented without departing from the spirit and scope of the present invention. Furthermore, it is appreciated that the present invention need not be limited to the application of microprocessors only, but can be used in applications with other processing devices as well.

Referring to FIG. 1, a packed word 10 is shown comprised of four data elements 11. As shown, word 10 is represented to have a length of 64 bits, wherein each data element 11 is 16 bits in length. Each data element 11 is independent of the other in that each represents a value on its own. Thus, each data element can be unpacked from the packed word 10 and repacked with different data elements into a new 64-bit packed word. Although each data element 11 can represent a variety of data types or formats, each data element 11 of the preferred embodiment (as shown in FIG. 1) represents signed data. Accordingly, each data element 11 will have fifteen bits for representing a numeric value and one bit (which is the most significant bit in the 16-bit string) for representing a sign value. However, it is appreciated that the present invention can be practiced with non-signed values as well, provided that an unsigned compare instruction is utilized instead of the signed comparison instruction described herein.

Since it is anticipated that the next generation of microprocessors will operate on a 64-bit architecture, the packed word 10 is shown represented as 64-bits wide. However, the actual width (or bit-length) of word 10 is a design choice depending on the processor architecture chosen. The number of data elements 11 packed into word 10 can also be a design choice. Accordingly, word 10 could be comprised of two data elements of 32-bit width each, four data elements of 16-bit widths each or eight data elements of 8-bit width each. Similarly, the same arrangement can be applied to a 32-bit word. Thus, if word 10 is 32 bits wide, then each of the data elements (is four are used) would be 8 bits wide. If a format for 16-bit data elements is desired, then there will only be two such data elements packed into a 32-bit word. Equivalent partitioning can be devised for a 128-bit system in which the width of word 10 would be 128 bits. Allowing several formats for packing into word 10 permits flexibility to the programmer.

It is also to be noted that the term word for packed word 10 is used to denote the width of the bit string formed by the packing of the data elements 11. The term word in this context need not be defined to coincide to the word-length defined for a particular architecture. Thus, for example, in a system where a single word is 32 bits wide, the packed word 10 of FIG. 1 would have a length corresponding to a double-word (as defined by the system architecture). The specific terminology is not critical to the understanding of the present invention. What is important is that data elements are packed into a bit-string, wherein this packed set of data elements are treated as an operand when program instructions operate on the packed data elements. In the example described here, four 16-bit data elements are packed into a 64-bit word.

Referring to FIG. 2, two operands 15 and 16 (also referred to as operands X and Y, respectively) are shown. Each operand 15 and 16 are equivalent to the packed word 10 of FIG. 1. Accordingly, operand X has four data elements identified as $X_0$, $X_1$, $X_2$ and $X_3$, while operand Y has four data elements 11b identified as $Y_0$, $Y_1$, $Y_2$ and $Y_3$. Each of the data elements 11a–b is 16-bits in width and each represents a value, as was noted in FIG. 1. Again, this is an illustration of the operation of the present invention and the actual format for packing the data elements can vary as earlier described. In this particular hypothetical example shown in FIG. 2, a signed numerical value comparison between each of the data elements 11a of operand X and corresponding data elements 11b of operand Y are depicted by symbols noted between the two operands. In this hypothetical example, $X_3$ is greater than $Y_3$, $X_2$ is less than $Y_2$, $X_1$ is greater than $Y_1$ and $X_0$ is equal to $Y_0$. It is appreciated that the relative comparisons noted for each of the corresponding data elements 11a–b are shown for the exemplary purpose of illustrating the operation of the present invention. It is also to be noted that the term "operand" is interchangeable used herein to refer to the data elements on which an instruction operates or the storage area in which the data can be found.

As will be noted in the subsequent description, a purpose of the present invention is to take two operands (such as operands X and Y), and determine the signed value relationship between corresponding data elements of the two operands and sort them according to the results of the comparison. As will be described in reference to the illustration of FIG. 3, it is desirable to select data elements between the two operands 15 and 16, so that in the end, the greater (or lesser) of the two values (taking the sign of the data into consideration) for each pair of data elements resides in one packed word, while the indices identifying the origin of the chosen values reside in another packed word. Essentially, the operation is to sort the pair of operands 15 and 16 so that one operand will contain all of the greater (or lesser) values and the second operand will contain the indices for the selected values.

Figure 3B:
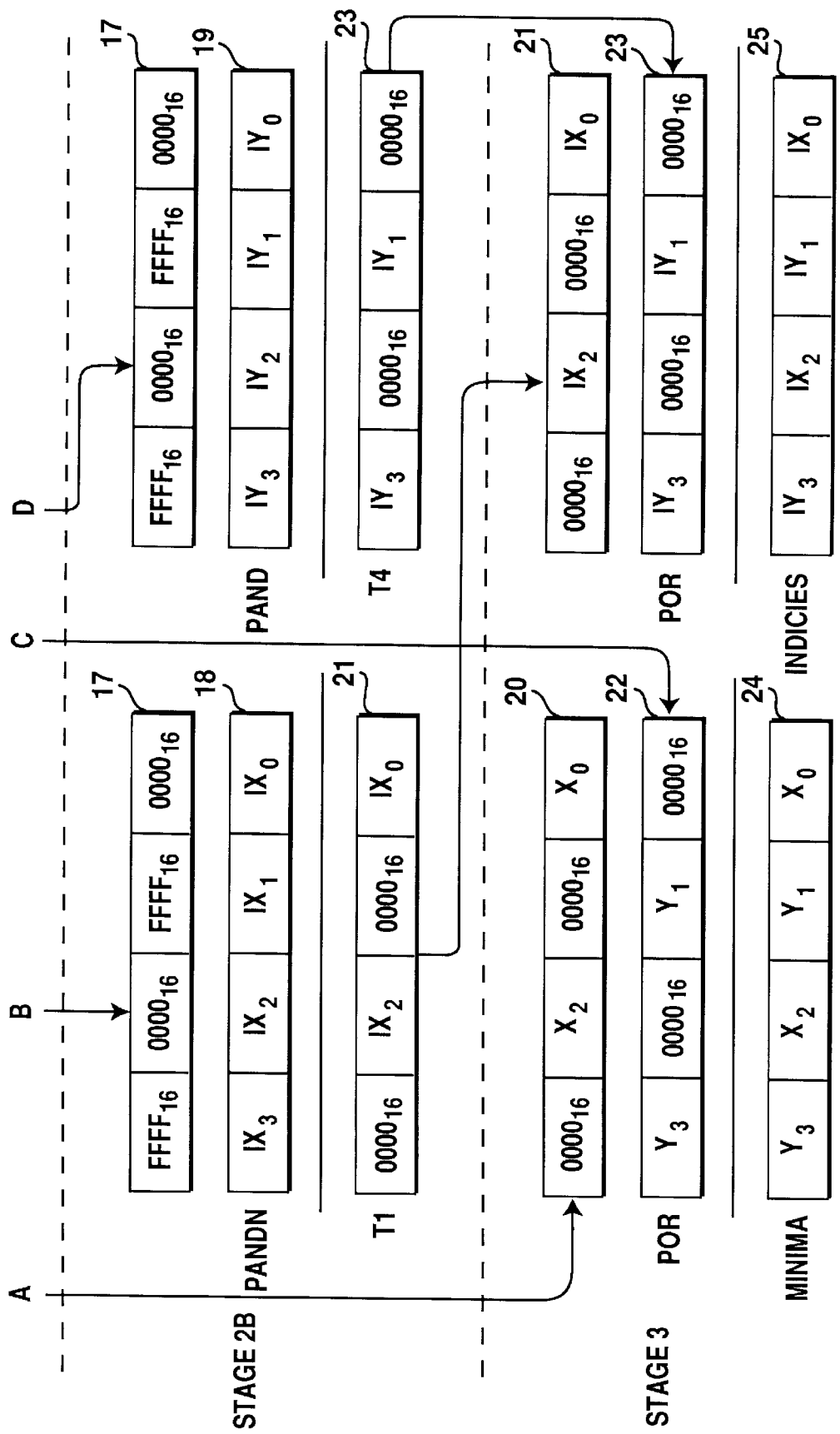

Referring to FIG. 3, three instruction execution stages are shown. The same two operands X and Y of FIG. 2 (with the noted exemplary value comparisons) are used as the starting (source) operands for FIG. 3. However, prior to the commencement of the three stages, data elements representing operand X are obtained and packed as an operand. Indices that identify (or index) the source or originating location of the date elements are also obtained for operand X and packed as data elements in operand 18. Then the same is done to the data elements representing Y and their corresponding indices. These data elements are packed as operands 16 and 19, respectively. Thus, prior to the commencement of stage 1, data elements $X_3$–$X_0$ are arranged as one operand 15 and their indices (Index $X_3$–Index $X_0$) are arranged as corresponding data elements ($IX_3$–$IX_0$) in the index operand 18. An equivalent arrangement is also achieved for the $Y_3$–$Y_0$ data elements and their indices $IY_3$–$IY_0$. The $Y_3$–$Y_0$ values are arranged in operand 16 and the $IY_3$–$IY_0$ values in operand 19. The indices are obtained or identified as relative addresses associated with the data. In the preferred embodiment, an index is obtained as a location in an array, offset to a base address in memory. Thus, each index is an offset associated with the location of the respective data from a base memory address.

In stage 1 only one instruction operation is noted. The operation of stage 1 takes the first operand (operand X in this instance) and performs a comparison operation on the second operand (operand Y). The particular comparison operation performed on the two operands in FIG. 3 is a comparison for determining if a value in the first operand X is greater than the corresponding value in the second operand Y. That is, for each pair of corresponding data elements in the two operands, the comparison operation determines if the value in operand X is greater than the value in operand Y.

In the preferred embodiment, an instruction identified as a Packed Comparison For Greater Than Word (PCMPGTW) is used to compare each pair of corresponding data elements of operands X and Y. A resultant value, identified as a mask operand 17, is generated as a result of the execution of the PCMPGTW instruction on operands X and Y. Operand 17 has the same packed data format as operands X and Y, but without the sign value. Instead, the data element values will be all ones (1s) or all zeroes (0s), depending on the comparisons. If the comparison is true, then the corresponding data element of operand 17 is filled with all 1s (the true condition is shown by the value $FFFF_{16}$ in operand 17 to denote that all sixteen bits of the data element are 1s). If the comparison is false, then the corresponding data element is filled with all 0s (the false condition is shown by the value $0000_{16}$ in operand 17 to denote that all sixteen bits of the data element are 0s). It is appreciated that the PCMPGTW instruction operates on four packed data elements, each having a width of sixteen bits. However, the PCMPGTW instruction can perform an equivalent operation on other packing formats supported by the architecture.

Since each data element of operand 17 contains $FFFF_{16}$ or $0000_{16}$ depending on the comparison operation, this resultant operand 17 is termed a "mask" and this mask will be used to identify those data elements of operands X and Y which are passed (or not passed) through in subsequent stages. That is, for a particular data element of mask operand 17, a $FFFF_{16}$ result identifies the condition in which the corresponding data element Xi is greater than the corresponding data element Yi. Where the particular result is $0000_{16}$, the corresponding Xi data element is less-than-or-equal-to the corresponding data element Yi. As will be noted below the masked value(s) will be used to identify those data elements Xi and Yi that need to be passed and those that need to be deleted.

During stage 2, the mask operand 17 is used with the X and Y operands to generate four temporary results identified as operands 20–23 (also noted as T1–T4 in FIG. 3). Stage 2 requires four separate instruction cycles, but in reality two instructions are used for sorting the values and these two operations are repeated again for sorting their indices. Thus, in FIG. 3, stage 2 is further divided into stages 2A and 2B. Another reason for this division is to separate the operations in the event the processor is not capable of executing all four instructions in parallel.

In stage 2A a Packed AND (PAND) instruction and a Packed AND-NOT (PANDN) instruction are used to perform logical operations on the value operands X and Y. In the first operation, the PANDN instruction is used to first take the complement of the mask operand 17 and then performing a logical AND operation on the complement of the mask operand 17 and operand X. This operation passes those data elements Xi which are not-greater-than (less-than-or-equal-to) the corresponding Yi data elements into a T1 operand 20. In the second operation of stage 2A, the PAND instruction is used to perform a logical AND operation on the mask operand 17 and the Y operand to generate T3 operand 22. Since this is an AND operation with the mask operand 17, those Yi values which are less than its corresponding Xi values are passed to T3 operand 22.

The same two logical operations are performed with the mask operand 17 on the two index operands 18 and 19 during stage 2B. The PANDN instruction is used to AND the complement of the mask operand 17 and the Index X operand 18. Similarly, the PAND instruction is used to AND the mask operand 17 and the Index Y operand 19. The result of the PANDN operation is placed in T2 operand 21 and the result of the PAND operation is placed in T4 operand 23.

Thus, in the hypothetical example of FIG. 3, $X_2$ and $X_0$ values are passed through to the T1 operand and $Y_3$ and $Y_1$ values are passed through to the T3 operand during stage 2A. During stage 2B, $IX_2$ and $IX_0$ values are passed through to the T2 operand and $IY_3$ and $IY_1$ values are passed through to the T4 operand. It is to be appreciated that the Xi and Yi values in T1 and T3 operands represent the lesser or equal values from the comparison of corresponding data elements of operands X and Y in stage 1. These values are termed lesser values (or minima). Operands T2 and T4 contain the corresponding IXi and IYi values respectively for the chosen (or selected) Xi and Yi minima of operands T1 and T3.

It is also to be appreciated that all four instructions can be executed in parallel where such parallel processing is available. However, if only a singular microprocessor with dual ALU capability is available, then the two instructions of stage 2A would be executed in parallel and then the two instructions of stage 2B would be executed in parallel. However, it is appreciated that the order in which these instructions are executed or combined into stages is a design choice. If no parallel processing capability exists, then each instruction will be executed sequentially.

During stage 3, a Packed OR (POR) instruction is used to logically OR the T1 and T3 operands to combine the minima into a single minima operand 24. Similarly, the POR instruction is also used to OR the T2 and T4 operands to combine the minima indices into a single minima indices operand 25. Again, when available, these two POR instructions can be executed in parallel.

Thus, in stage 3, the OR'ing of the selected Xi and Yi values provides a final minima operand 24, which contains lesser or equal value for each pair of corresponding data elements of operands X and Y. These Xi and Yi values (minima) are now sorted in to a singular minima operand 24. A similar parallel technique shown in stages 2 and 3 with the mask are used to obtain the indices for each of the data elements selected in operand 24. These indices identify (index) which corresponding Xi or Yi value was chosen as minima in operand 24. Since equivalent techniques are used in stages 2 and 3, the same set of indices as the set of data elements are chosen, so that one-to-one relationship exists between the value data elements in operand 24 and indices data elements in operand 25. The indices operand 25 provides an ordering (indexing) of the selected Xi/Yi values which are present in operand 24.

It is appreciated that when a particular corresponding Xi and Yi values are equal, the example of FIG. 3 selects the value in the first source operand 15, which in the example is $X_0$. However, if the Yi values were in the first operand 15, then the resulting minima value would be $Y_0$, instead of $X_0$. Thus, where values are equal, the data element in the first operand is selected in the example of FIG. 3.

Figure 4B:
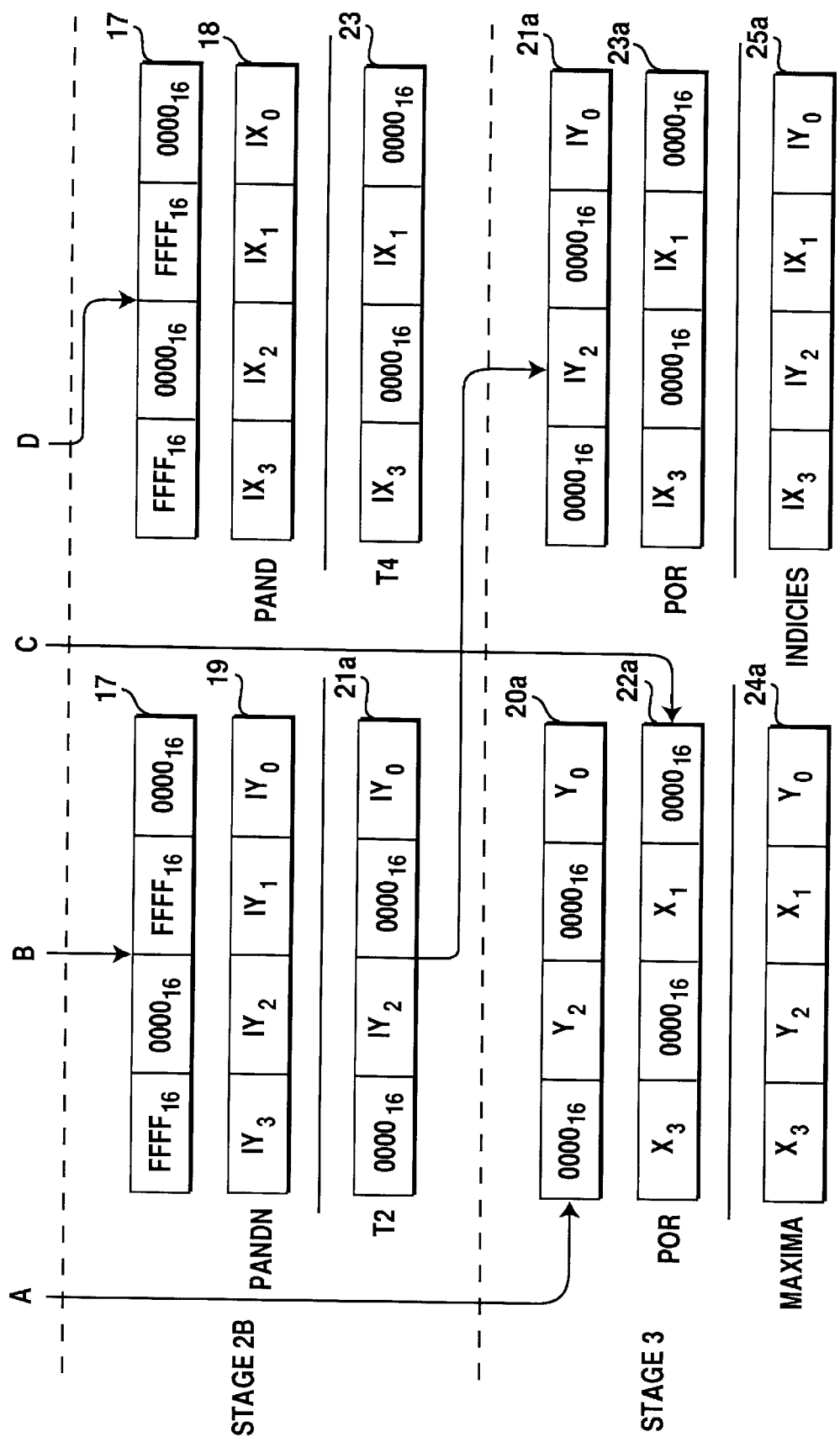

Referring to FIG. 4, an equivalent set of instructions and operations as FIG. 3 is shown, but with the difference that in FIG. 4 a greater or equal values (maxima) are being determined with their indices. The arrangement is the same as FIG. 3, except that in this instance, the second source operands (operands Y and Index Y in this instance) are subjected to the PANDN instruction and the first operands (operands X and Index X) are subjected to the PAND instruction. That is, the PAND and PANDN operations are reversed in FIG. 4 from those operations shown in FIG. 3 in stage 2. Note that the mask values of the mask operand 17 has not changed. However, instead of the minima being passed, the maxima are now passed through to stage 3. The resulting operands 24a and 25a at the end of stage 3 now contain maxima data elements and indices for the maxima data elements. Thus, maxima can be sorted and ordered with the practice of the present invention as well. Note that where data element values are equal, the other equal value of the second operand 16 (in this instance $Y_0$) is passed through as a data element in the maxima operand 24a and correspondingly its index in operand 25b.

It is also appreciated that in the particular example, a "greater-than" comparison was performed in stage 1 to obtain the mask operand 17. However, it is possible to use other comparison relationships as well. Less-than, greater-than-or-equal-to or less-than-or-equal-to comparisons can be used as well for the comparison of data elements of operands X and Y. Appropriate packed instructions will generate comparisons on operands X and Y. A corresponding difference will be noted in the mask being generated, but with corresponding changes to the logical operatives in the subsequent stages. Thus, other techniques can be adapted to sort the data elements into maxima/minima with indices to provide the ordering.

Figure 5:
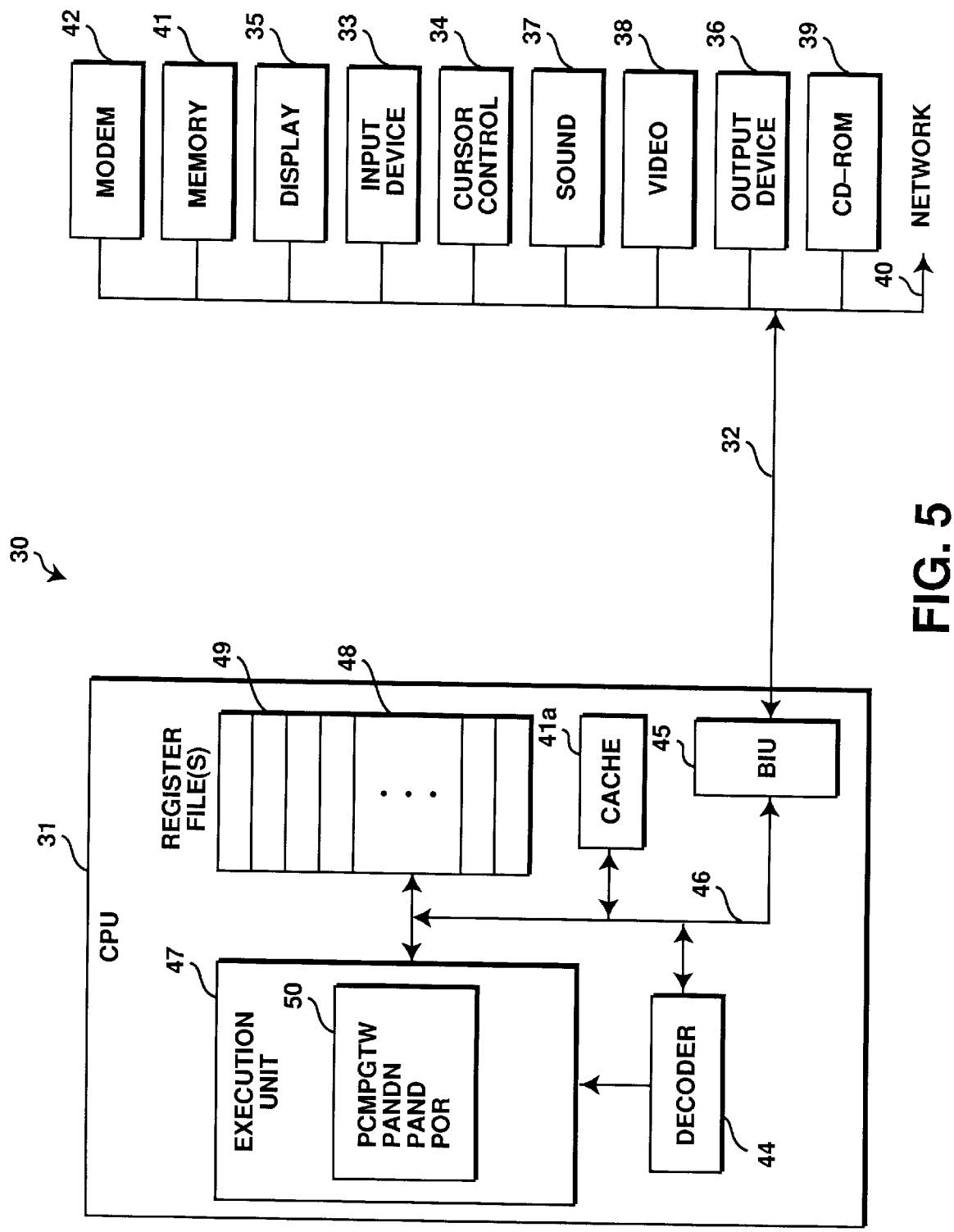
FIG. 5 is a block diagram of an exemplary computer system in which packed instructions are executed in order to practice the scheme of the present invention in sorting numbers and providing indices for those numbers chosen.

It is appreciated that the present invention can be implemented in a variety of ways, but a typical implementation is in a computer system, such as a system shown in FIG. 5. FIG. 5 illustrates a computer system 30 according to one embodiment of the invention. The exemplary computer system 30 is comprised of a processor or central processing unit (CPU) 31 coupled to a variety of devices by a bus 32. In the preferred embodiment, CPU 31 is an integrated circuit microprocessor. Typical devices which are coupled to the bus 32 are an input device 33 (such as a keyboard), a cursor control device 34 (such as a "mouse"), a display unit 35 (such as a video monitor), and an output device 36 (such as a printer). With the advent of multimedia systems, the exemplary computer 30 may include a sound device 37 (such as a sound card and speakers), a video device 38 (such as video accelerators and motion video devices) and a CD-ROM drive and controller 39. The computer 30 may include a modem 42 to provide a communication link to a telephone line. Furthermore, the computer system 30 could be coupled to a network 40 which is coupled to a plurality of other computer systems. It is appreciated that network 40 can be of a variety of communicating medium, including the Internet and its World Wide Web.

The computer system 30 is also coupled to a memory system 41. The memory system 41 provides for the storage of information which will be used by or have been processed by the processor 31. The memory system 41 is represented as a system since it generally is comprised of different types of memory devices. Typically, a volatile main memory is provided in a form of a dynamic random-access-memory (RAM) and a non-volatile mass storage unit is provided in a form of a magnetic disk-drive ("hard" disk) unit. Furthermore, a faster cache memory is usually provided in a form of a static RAM to cache data being used by the processor 31. In some systems, there may be several levels of caches memories. It is also appreciated that the processor itself may have some of the memory resident in the processor chip itself. For example, with current processor technology, level 1 caches are generally chip resident within processor 31. This cache memory internal to the processor is shown as cache memory 41a in FIG. 5. Thus, all of the memory associated with computer system 30 is illustrated by the representation of memory blocks 41 and 41a (in which block 41a is treated as part of memory system 41 from a functional viewpoint). It is appreciated that resident somewhere in this memory system 41 are program routines which instruct the processor 31 how to operate and process data, which data can also be stored within the memory system 41.

Processor 31 is comprised of a number of various functional units, but only those units relevant to the understanding of the present invention are illustrated in FIG. 5. The various devices described above are coupled to processor 30 by the bus 32. Bus 32 is typically identified as a peripheral bus. A bus interface unit (BIU) 45 couples the bus 32 to an internal bus 46. The bus 46 is internal to processor 31 and is utilized for the transfer of information between BIU 45 and units of processor 31. It is to be appreciated that either bus 32 or 46 may be actually comprised of a plurality of buses. A decoder 44, an execution unit 47 and a register file 48 are coupled to bus 46. The decoder 44 is used to receive and decode instructions (such as the instructions of the present invention) which control the operation of the execution unit 47. The execution unit 47 is the core unit within the processor 31 for executing various instructions required by a program routine. Generally, with more advanced processors, the execution unit 47 is comprised of more than one arithmetic-logic unit (ALU) operating in parallel so that more than one computer instruction can be executed at any one time. In the microprocessor of the preferred embodiment, at least two ALUs are present so that two instructions can be executed in parallel.

The register file 48 is comprised of a plurality of individual registers 49 arranged in one or more register files. The register files are used to store information used by the execution unit 47. The proximity of the registers 49 to the execution unit ensures that minimal delay is encountered in processing the information stored within the registers 49. With advanced processors, there will typically be more than one register file 48. For example, an integer register file for operating on integer data and a floating point register file for operating on floating point data are common techniques of using multiple register files. In processors with specialized multimedia instructions, a multimedia register file may be a third form of register file present within processor 31. Thus, although one register file is shown in FIG. 5, it is understood that it may actually be comprised of multiple register files. It is appreciated that the present invention can be implemented with one or more register files.

In a typical processor, such as the exemplary processor 31, there is a set architecture which defines the operation of processor 31. With each architecture, a set of program instructions are defined for use with the processor operating under that architecture. When these instructions are received by the processor, the decoder 44 is capable of decoding the instructions and generating decoded control signals to execute the instructions. Thus, these instructions instruct the processor as to which registers 49 in a particular register file 48 is to be accessed for executing the instruction. It is into this framework that the instructions of the present invention are utilized.

As shown in block 50, the PCMPGTW, PANDN, PAND and POR instructions are designed into the instruction set of the exemplary processor 31, so that the decoder 44 is capable of decoding these instructions and the execution unit 47 is capable of executing on these instructions. Accordingly, values associated with the various operands of FIG. 3 are placed (also referred to as "loaded," "saved" or "stored") in to the registers 49 of register file 48. Generally, where a dedicated multimedia register file is present, the instructions would utilize this register file. However, again there is no requirement that a particular register file be used. Rather, the present invention can be readily used with most types of registers, provided that the bit-length (width) of the registers can accommodate the data being operated on by the instructions. The "P" prefix of the four instructions denote the application of the instructions on packed data elements. As noted earlier, how the data elements are packed into a word having a prescribed number of bits (that is, the number of data elements in a word) is a programming choice and there may be several formats available to the programmer. The "packed" instructions of the present invention can be made flexible in order to support all of the available formats. That is, the "packed" instructions of the present invention adapt to operate on each data element for the various packing formats supported in the system architecture.

Likewise, the circuitry for performing the various operations described in reference to the four instructions resides within processor 31 and generally within execution unit 47. Accordingly, the four instructions of the present invention are shown as part of the instruction set 50 within execution unit 47. Again, it is to be noted that other units, such as instruction and data fetch units, timers and other well-known units within a processor 31 are not shown, since the operation of such units are well-known in the art.

Figure 6:
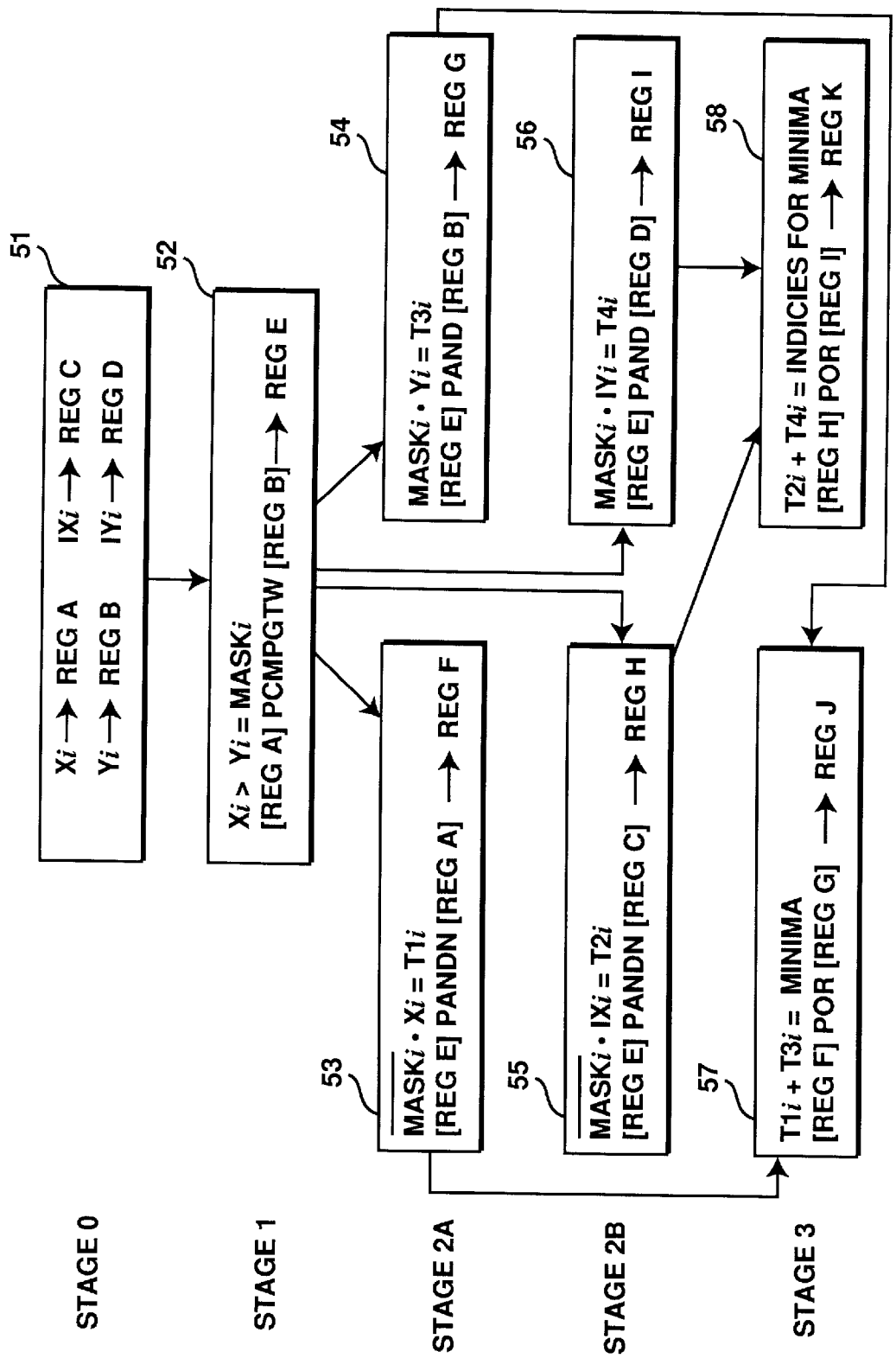
FIG. 6 is a block diagram of an embodiment of the present invention in which each operation of FIG. 3 is linked to registers for executing the instructions to sort the values for determining minima along with their indices.

Referring to FIG. 6, the operations of the various instructions to perform the sorting operation and to obtain the minima and their indices according to the present invention are shown in a flow diagram form. Prior to the commencement of the operations noted in FIG. 3, the data elements which are to comprise operand X in the example are packed and loaded into register A. Similarly, data elements which are to comprise operand Y are packed and loaded into register B. The indices for the data elements for X and Y are loaded into registers C and D, respectively. These actions are noted in block 51 and identified as actions pertaining to stage 0.

Subsequently, PCMPGTW instruction performs the greater-than comparison of the contents of the data elements resident in registers A and B (operands X and Y). This action is shown in block 52 and the result (which is the mask operand 17) is placed into register E. In stage 2A, the complement of the contents of register E (mask) are AND'ed with the data elements of X (contents of register A) and the result placed into register F, as shown in block 53. Also during this stage, the contents of register E are AND'ed with the data elements of Y (contents of register B) and the result placed into register G, as shown in block 54.

In stage 2B, the complement of the contents of register E are AND'ed with the indices of X in register C and the result placed into register H, as shown in block 55. Also during this stage, the contents of register E are AND'ed with the indices of Y in register D and the result placed into register 1, as shown in block 56. Subsequently, during stage 3, contents of registers F and G are OR'ed to generate the minima, which minima are placed into register J. Also during stage 3, contents of registers G and I are OR'ed to pass the indices for the chosen minima and these indices are placed into register K.

Again, it is to be appreciated that all four blocks of stage 2 (2A and 2B) can be executed in parallel if processing capability exists to do so. However, where only a single microprocessor is present, it is likely that only two instructions can be executed in parallel. Accordingly the separation of this stage into stage 2A and stage 2B, indicates that only two instructions can be executed in parallel.

It is appreciated that the computer system 30 can be utilized in a variety of ways to practice the present invention. For example, data can be received as an input from one of the peripheral connections shown in FIG. 5 (such as receiving image data from the network 40 or data input from modem 42). The data is then stored in memory 41. Subsequently, data is packed and loaded into the registers 49 and operations noted in reference to FIGS. 3 and 5 are performed to sort the operands to obtain minima with ordering. An equivalent operation pursuant to the illustration in FIG. 4 would generate maxima with ordering.

As an example, the present invention can be utilized to provide some of the data processing function in a recognition operation. Furthermore as an example, an input signal can be coupled to the computer system 30 shown in FIG. 4. The signal can be coupled through one of the devices shown. It is understood that if the input signal is not a digital signal (such as speech), then known techniques are used first to convert the analog signal to a digital signal. Then, as part of a pattern recognition process, the input signal is compared to a known reference. Typically, pattern recognition algorithm(s) is/are employed for performing many of the recognition routines.

In the recognition example, the present invention would be utilized to compare input signals to a reference value (such as threshold value) to determine if a particular signal is above or below the threshold. The sorting of the data and the indices will identify which data are above (or below) the threshold. Then, appropriate operations can be performed on the input signals. Thus, one example of the use of the present invention is shown and it is to be noted that the use of the present invention is not limited to the above described example.

In reference to the packed instructions noted above, it is appreciated that the particular instructions noted in FIGS. 3 and 4 for practicing the present invention can be readily substituted by other logical operations without departing from the spirit and scope of the present invention to obtain minima or maxima with ordering. There are a variety of ways to implement the noted packed instructions of the preferred embodiment, but one description of packed instructions is disclosed in a patent application titled "Set Of Instructions For Operating On Packed Data;" Ser. No. 08/521,360; filed Aug. 31, 1995.

Finally, it is appreciated that the PCMPGTW instruction can be replaced by other arithmetic comparison operatives as well. It is important to note that the comparison instruction does not utilize branching operations to decide on the outcome of the comparison. The PCMPGTW instruction is an arithmetic operation where the sign of the result of the difference between the operands is used to create a mask. The operation of the particular PCMPGTW instruction of the preferred embodiment is disclosed in a patent application titled "A Microprocessor having A Compare Operation;" Ser. No. 08/349,040; filed Dec. 2, 1994.

Thus, a technique for sorting packed numbers of two operands to determine maxima or minima with corresponding indices for ordering is described.

We claim:

1. In a processor for processing instructions which operate on a plurality of data elements packed into an operand, a method of sorting numerical values into a minima or maxima grouping, comprising the steps of:

comparing data elements of a first source operand to corresponding data elements of a second source operand by performing a comparison operation, wherein said data elements of said two source operands represent numerical values, in order to determine a numerical relationship between each pair of said corresponding data elements of said two source operands, wherein at least some data elements in one or both of said first and second source operands represents handwriting, speech, optical or other type of input to be recognized;

generating a mask operand which has data elements corresponding to a result of said numerical relationship;

providing an index value for each of said data elements of said first and second operands and placing index values (indices) for data elements of said first source operand into a first indices operand and placing indices for data elements of said second operand into a second indices operand;

performing a first set of logical operations between said first source operand and said mask operand and also between said second source operand and said mask operand, in order to generate a first set of interim results comprised of data elements of said first and second source operands which have a common logical result from said comparison operation of corresponding data elements;

combining said first set of interim results to generate a minima or maxima operand in which its data elements represent one value from each corresponding pair of values of said two source operands based on said comparison of said numerical relationship;

performing a second set of logical operations which are equivalent to said first set of logical operations between said first indices operand and said mask operation and also between said second indices operand and said mask operand, in order to generate a second set of interim results comprised of data elements of said first and second indices operands which have a common logical result from said comparison operation of corresponding data elements;

combining said second set of interim results to generate a minima or maxima indices operand in which its data elements represent on value from each corresponding pair of values of said two indices operands based on said comparison of said numerical relationship, said combined indices identifying origin of each data element in said minima or maxima operand.

2. The method of claim 1 in which said step of generating said mask operand generates corresponding data elements having all 1 values or all 0 values, based on comparison of said numerical relationship between each pair of corresponding data elements of said two operands.

3. The method of claim 1 wherein said minima or maxima operand is generated in three instruction execution cycles in a parallel processing processor.

4. In a processor for processing instructions which operate on a plurality of data elements packed into an operand, a method of sorting numerical values into a minima grouping, comprising the steps of:

comparing data elements of a first source operand to corresponding data elements of a second source operand by performing a comparison operation, wherein said data elements of said two source operands represent numerical values, in order to determine a numerical relationship between each pair of said corresponding data elements of said two source operands, and wherein at least some of said data elements in one or both of said two source operands represents handwriting, speech, optical or other type of input to be recognized;

generating a mask operand which has data elements corresponding to a result of said numerical relationship;

providing an index value for each of said data elements of said first and second operands and placing index values (indices) for data elements of said first source operand into a first indices operand and placing indices for data elements of said second operand into a second indices operand;

performing a first logical operation which is an AND-NOT operand to AND a complement of said mask operand and said first source operand, in order to generate a first interim operand in which its data elements correspond to results of said first logical operation;

performing a first logical operation which is an AND-NOT operation to AND a complement of said mask operand and said first source operand, in order to generate a first interim operand in which its data elements correspond to results of said first logical operation;

performing a second logical operation which is an AND operation to AND said mask operand and said second source operand in order to generate a second interim operand in which its data elements correspond to results of said second logical operation;

performing a third logical operation which is an OR operation to OR corresponding data elements of said first and second interim operands to generate a minima operand in which its data elements represent lesser or equal value from each corresponding pair of values of said two source operands;

performing a fourth logical operation which is equivalent to said first logical operation on said mask operand and said first indices operand, in order to generate a third interim operand in which its data elements correspond to results of said fourth logical operation;

performing a fifth logical operation which is equivalent to said second logical operation on said mask operand and said second indices operand, in order to generate a fourth interim operand in which its data elements correspond to results of said fifth logical operation;

performing a sixth logical operation which is equivalent to said third logical operation on corresponding data elements of said third and fourth interim operands to generate a minima indices operand in which its data elements represent indices of minima operand generated, said indices identifying origin of each data element in said minima operand.

5. The method of claim 4 in which said step of generating said mask operand generates corresponding data elements having all 1 values or all 0 values, based on comparison of said numerical relationship between each pair of corresponding data elements of said two operands.

6. The method of claim 5 in which said step of comparing data elements of said two source operands is based on a greater-than comparison relationship, such that for each pair of corresponding values if said comparison is true, then their corresponding data element in said mask operand is all 1s, but if said comparison is false, then their corresponding data element in said mask operand is all 0s.

7. The method of claim 6 wherein said minima operand is generated in three instruction execution cycles in a parallel processing processor.

8. In a processor for processing instructions which operate on a plurality of data elements packed into an operand, a method of sorting numerical values into a maxima grouping, comprising the steps of:

comparing data elements of a first source operand to corresponding data elements of a second source operand by performing a comparison operation, wherein said data elements of said two source operands represent numerical values, in order to determine a numerical relationship between each pair of said corresponding data elements of said two source operands, and wherein at least some of said data elements in one or both of said two source operands represents handwriting, speech, optical or other type of input to be recognized;

generating a mask operand which has data elements corresponding to a result of said numerical relationship;

providing an index value for each of said data elements of said first and second operands and placing index values (indices) for data elements of said first source operand into a first indices operand and placing indices for data elements of said second operand into a second indices operand;

performing a first logical operation which is an AND-NOT operation to AND a complement of said mask operand and said second source operand, in order to generate a first interim operand in which its data elements correspond to results of said first logical operation;

performing a second logical operation which is an AND operation to AND said mask operand and said first source operand in order to generate a second interim operand in which its data elements correspond to results of said second logical operation;

performing a third logical operation which is an OR operation to OR corresponding data elements of said first and second interim operands to generate a maxima operand in which its data elements represent greater or equal value from each corresponding pair of values of said two source operands;

performing a fourth logical operation which is equivalent to said first logical operation on said mask operand and said second indices operand, in order to generate a third interim operand in which its data elements correspond to results of said fourth logical operation;

performing a fifth logical operation which is equivalent to said second logical operation on said mask operand and said first indices operand, in order to generate a fourth interim operand in which its data elements correspond to results of said fifth logical operation;

performing a sixth logical operation which is equivalent to said third logical operation on corresponding data elements of said third and fourth interim operands to generate a maxima indices operand in which its data elements represent indices of maxima operand generated, said indices identifying origin of each data element in said maxima operand.

9. The method of claim 8 in which said step of generating said mask operand generates corresponding data elements having all 1 values or all 0 values, based on comparison of said numerical relationship between each pair of corresponding data elements of said two operands.

10. The method of claim 9 in which said step of comparing data elements of said two source operands is based on a greater-than comparison relationship, such that for each pair of corresponding values if said comparison is true, then their corresponding data element in said mask operand is all 1s, but if said comparison is false, then their corresponding data element in said mask operand is all 0s.

11. The method of claim 10 wherein said maxima operand is generated in three instruction execution cycles in a parallel processing processor.

* * * * *